(12) United States Patent
Yanai

(10) Patent No.: US 8,998,417 B2
(45) Date of Patent: Apr. 7, 2015

(54) POLARIZATION CONTROLLER, PROJECTOR SYSTEM, POLARIZATION CONTROL METHOD AND IMAGE CONTROL METHOD

(71) Applicant: Seiko Epson Corporation, Tokyo (JP)

(72) Inventor: Hiroaki Yanai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 119 days.

(21) Appl. No.: 13/776,142

(22) Filed: Feb. 25, 2013

(65) Prior Publication Data

US 2013/0229586 A1  Sep. 5, 2013

(30) Foreign Application Priority Data

Mar. 2, 2012  (JP) .................. 2012-046944

(51) Int. Cl.
  *G03B 21/00* (2006.01)
  *G02F 1/13* (2006.01)
  *G02F 1/01* (2006.01)
  *H04N 13/04* (2006.01)

(52) U.S. Cl.
  CPC ............ *G02F 1/1313* (2013.01); *G02F 1/0136* (2013.01); *H04N 13/0434* (2013.01); *H04N 13/0459* (2013.01); *H04N 13/0497* (2013.01)

(58) Field of Classification Search
  CPC ... G09G 3/001; G09G 3/003; H04N 13/0497; H04N 13/0434; H04N 13/0438; H04N 13/0459

USPC .................. 353/7, 8, 20, 85, 94, 98, 121; 348/743–747; 349/5, 7–9; 359/462, 359/464, 466, 471–472, 630
  See application file for complete search history.

(56) References Cited

U.S. PATENT DOCUMENTS

| | | | |
|---|---|---|---|
| 7,230,759 B2 * | 6/2007 | Huang et al. .................. | 359/465 |
| 2004/0233527 A1 * | 11/2004 | Palovuori ...................... | 359/464 |
| 2009/0103178 A1 | 4/2009 | Woodgate et al. | |
| 2010/0079728 A1 | 4/2010 | Lee et al. | |
| 2010/0195006 A1 * | 8/2010 | Iwai et al. ........................ | 349/9 |
| 2010/0289969 A1 * | 11/2010 | Yamazaki et al. ............. | 348/744 |
| 2011/0007279 A1 * | 1/2011 | Silverstein et al. ............... | 353/8 |
| 2011/0032483 A1 * | 2/2011 | Hruska et al. ...................... | 353/8 |
| 2011/0221716 A1 | 9/2011 | Sugiyama | |
| 2011/0310348 A1 * | 12/2011 | MacNaughton et al. ......... | 353/8 |

FOREIGN PATENT DOCUMENTS

JP  A-2000-347155  12/2000
JP  A-2005-084669  3/2005

(Continued)

*Primary Examiner* — Sultan Chowdhury
(74) *Attorney, Agent, or Firm* — Oliff PLC

(57) ABSTRACT

A polarization controller adapted to output respective projection lights for a right-eye image and a left-eye image that are incident from a projector to a screen in different polarization directions, includes: a liquid crystal device adapted to change the polarization directions of the projection lights; and a controller adapted to control the liquid crystal device so that the respective projection lights for the right-eye image and the left-eye image have different polarization directions, wherein the controller performs control for mirror-reversing the polarization directions of the projection lights in the liquid crystal device according to a control signal indicating whether the projector performs mirror reversal of the right-eye image and the left-eye image, input from the projector.

8 Claims, 5 Drawing Sheets

(56) References Cited

FOREIGN PATENT DOCUMENTS

| JP | A-2009-122430 | 6/2009 |
| JP | A-2010-509629 | 3/2010 |
| JP | A-2010-169740 | 8/2010 |
| JP | A-2011-191491 | 9/2011 |
| JP | A-2011-197522 | 10/2011 |
| WO | WO 2008/056929 A1 | 5/2008 |

* cited by examiner

US 8,998,417 B2

POLARIZATION CONTROLLER, PROJECTOR SYSTEM, POLARIZATION CONTROL METHOD AND IMAGE CONTROL METHOD

BACKGROUND

1. Technical Field

The present invention relates to a polarization controller, a projector system, a polarization control method and an image control method, for a three-dimensional image display.

2. Related Art

In the related art, a three-dimensional image display system that stereoscopically displays a display image as a three-dimensional image has been proposed (for example, see JP-A-2009-122430).

A polarized 3D system has been known as a method of stereoscopically displaying the display image as the three-dimensional image.

According to the polarized 3D system, two parallax images having different polarization directions from each other are projected by a liquid crystal projector (hereinafter, referred to as a 3D (three-dimensional) projector) or the like corresponding to the three-dimensional image display, and the two parallax images are divided by polarized glasses or the like so that the polarization directions are different from each other, to divide the image between the right eye and the left eye (for example, see JP-A-2009-122430). In viewing the display image with the polarized 3D system, light for an image to be viewed by a viewer is transmitted in the order of the 3D projector, the polarization controller, a screen and the polarization glasses.

That is, if projection lights for the parallax images are output from the 3D projector, the polarization controller polarizes the projection lights. For example, in a case where the projection lights are linearly polarized lights, the polarization controller polarizes the projection light for a right-eye image into a left-handed circularly polarized light and polarizes the projection light for a left-eye image into a right-handed circularly polarized light.

Then, the projection lights of the respective circularly polarized lights are projected onto the screen, and reflected lights enter the eyes of the viewer through the polarization glasses, in which the polarization directions of right and left glasses are different from each other, which are worn by the viewer. Then, the viewer views a three-dimensional image by the parallax images that enter the right eye and the left eye.

The 3D projector disclosed in the above-mentioned JP-A-2009-122430 or the like is capable of performing a simple front projection in which the viewer views images projected on the screen through the polarization glasses and also a rear projection in which the viewer views images projected on a rear surface of the screen from a front surface of the screen.

Further, in the case of any projection, in a case where the distance between the polarization controller and the screen does not correspond to a straight line due to a problem or the like of the structure of a room, the projection lights output from the polarization controller are reflected once or plural times by a reflection mirror and are projected onto the screen, so that the viewer views the images using the polarization glasses.

Here, as described above, for example, in a case where, in the projection lights projected on the screen, the projection light for the right-eye image is set as the right-handed circularly polarized light and the projection light for the left-eye image is set as the left-handed circularly polarized light, the polarization directions of the respective projection lights are horizontally reversed due to reflection on the screen (due to phase reversal caused by mirror reflection). For example, the polarization glasses have a configuration corresponding to one-time reflection, in which a left eye glass transmits light of the right-handed circularly polarized light and a right eye glass transmits light of the left-handed circularly polarized light.

That is, the polarization directions of the projection lights output from the polarization controller are horizontally reversed due to reflection on the screen. For example, the right-handed circularly polarized light is reversed into the left-handed circularly polarized light, and the left-handed circularly polarized light is reversed into the right-handed circularly polarized light.

In this way, the projection light for the right-eye image that is reversed into the left-handed circularly polarized light enters the right eye of the viewer through the right eye glass of the polarization glasses (that transmits the light of the left-handed circularly polarized light). Further, the projection light for the left-eye image that is reversed into the right-handed circularly polarized light enters the left eye of the viewer through the left eye glass of the polarization glasses (that transmits the light of the right-handed circularly polarized light). Thus, the viewer can view a three-dimensional image by the parallax images of the right-eye image that enters the right eye and the left-eye image that enters the left eye.

On the other hand, in a case where the number of reflections is even, at a point of time when the projection lights enter the polarization glasses, the polarized lights of the respective projection lights for the right-eye image and the left-eye image output from the polarization controller are not horizontally reversed.

Thus, in a case where the polarization glasses are configured so that the left eye glass transmits the right-handed circularly polarized light and the right eye glass transmits the left-handed circularly polarized light, the projection light for the right-eye image enters the left eye and the projection light for the left-eye image enters the right eye, and thus, the viewer cannot view a correct three-dimensional image.

As described above, in a case where since respective polarization characteristics of the right eye glass and the left eye glass of the polarization glasses are fixed, the polarization directions of the left-eye image and the right-eye image do not correspond to transmission characteristics of the right eye glass and the left eye glass of the polarization glasses as the number of reflections of the projection lights is even or odd, the viewer cannot view a correct three-dimensional image.

SUMMARY

An advantage of some aspects of the invention is to provide a polarization controller, a projector system, a polarization control method and an image control method in which a viewer can view a correct 3D image that matches with polarization directions where left and right glasses of polarization glasses transmit lights, without a viewer's adjustment of polarization directions of projection lights as the number of reflections of the projections lights is even or odd even in any case where the number of reflections until the projection lights of the 3D projector reach the polarization glasses is even or odd.

An aspect of the invention is directed to a polarization controller that outputs respective projection lights for a right-eye image and a left-eye image that are incident from a projector to a screen indifferent polarization directions, including: a liquid crystal device that changes the polarization directions of the projection lights; and a controller that controls the liquid crystal device so that the respective projection lights for the right-eye image and the left-eye image have different polarization directions, wherein the controller performs control for mirror-reversing the polarization directions of the projection lights in the liquid crystal device in association with a mirror reversal process of the images in the projector according to a control signal indicating whether the projector performs mirror reversal of the right-eye image and the left-eye image, input from the projector.

Another aspect of the invention is directed to a polarization control method of outputting respective projection lights for a right-eye image and a left-eye image that are incident from a projector to a screen in different polarization directions, the method including: changing the polarization directions of the projection lights, by a liquid crystal device; and controlling the liquid crystal device so that the respective projection lights for the right-eye image and the left-eye image have different polarization directions, by a controller, wherein the controller performs control for mirror-reversing the polarization directions of the projection lights in the liquid crystal device in association with a mirror reversal process of the images in the projector according to a control signal indicating whether the projector performs mirror reversal of the right-eye image and the left-eye image, input from the projector.

With the above configurations, according to the aspects of the invention, using a mechanism in which a viewer controls mirror-reversal of images generally installed in a projector, the control of mirror-reversal of the polarization directions of the projection lights projected onto a screen is performed using a switching signal, indicating whether the horizontal reversal of the images is performed, as a control signal. Thus, it is not necessary for the viewer to switch the setting of the polarization controller every time to appropriately adjust the polarization directions of the projection lights according to the number of reflections of the projection lights, and thus, it is easy for the viewer to use the polarization controller. Further, it is possible to simplify the configuration of the polarization controller.

Still another aspect of the invention is directed to the polarization controller described above, wherein the controller performs control so that the polarization directions of the respective projection lights for the right-eye image and the left-eye image become predetermined polarization directions in a case where the number of reflections of the projection lights is even, and so that the polarization directions of the respective projection lights for the right-eye image and the left-eye image become polarization directions obtained by mirror-reversing the predetermined polarization directions in a case where the number of reflections of the projection lights is odd.

With the above configuration, according to the aspect of the invention, the polarization directions of the respective projection lights for the right-eye image and the left-eye image are controlled according to the number of reflections until the projection lights reach the polarization glasses worn by the viewer from the polarization controller, and thus, the right-eye image enters the right eye and the left-eye image enters the left eye. Thus, reversal of the right-eye image and the left-eye image is prevented.

Yet another aspect of the invention is directed to the polarization controller described above, wherein the control signal is a signal indicating that the mirror-reversal process of the right-eye image and the left-eye image is performed in the projector according to the number of reflections of the projection lights, and the controller performs control so that the polarization directions of the respective projection lights for the right-eye image and the left-eye image is mirror-reversed in synchronization with the control signal.

With the above configuration, according to the aspect of the invention, it is determined whether the images are also mirror-reversed according to whether the number of reflections is even or odd, in a similar way to the reversal of the polarization directions, and thus, using a mechanism in which a viewer controls mirror-reversal of images generally installed in a projector, the control of mirror-reversal of the polarization directions of the projection lights projected onto a screen is performed using a switching signal indicating whether the horizontal reversal of the images is performed as a control signal. Thus, it is not necessary for the viewer to be conscious of switching of the polarization directions of the projection lights, and thus, it is easy for the viewer to use the polarization controller. Further, it is not necessary to provide a special mechanism for control of the polarization controller in the projector, and it is possible to simplify the configuration of the polarization controller.

Still yet another aspect of the invention is directed to a projector system including: a projector that outputs respective projection lights for a right-eye image and a left-eye image; and a polarization controller including a liquid crystal device that changes the polarization directions of the projection lights, and a controller that controls the liquid crystal device so that the respective projection lights for the right-eye image and the left-eye image have different polarization directions, wherein the controller performs control for mirror-reversing the polarization directions of the projection lights in the liquid crystal device according to a control signal indicating that the projector performs mirror reversal of the right-eye image and the left-eye image, input from the projector.

With the above configuration, according to the aspect of the invention, using a mechanism in which a viewer sets mirror-reversal of images generally installed in a projector according to whether the number of reflections is even or odd, the control of mirror-reversal of the polarization directions of the projection lights projected onto a screen is performed using a switching signal indicating whether the horizontal reversal of the images is performed as a control signal. Thus, it is not necessary for the viewer to be conscious of switching of the polarization directions of the projection lights, and thus, it is easy for the viewer to use the polarization controller. Further, it is not necessary to provide a special mechanism for control of the polarization controller in the projector, and it is possible to simplify the configuration of the polarization controller.

Further another aspect of the invention is directed to a projector system including: a first projector that outputs a projection light for a right-eye image; a second projector that outputs a projection light for a left-eye image; a first polarization controller that is provided corresponding to the first projector and includes a first liquid crystal device that polarizes a polarization direction of the projection light for the right-eye image and a first controller that controls the first liquid crystal device; and a second polarization controller that is provided corresponding to the second projector and includes a second liquid crystal device that polarizes a polarization direction of the projection light for the left-eye image and a second controller that controls the second liquid crystal device so that the polarization direction of the projection light for the left-eye image becomes a polarization direction different from the polarization direction of the right-eye image, wherein the first controller performs control for mirror-reversing the polarization direction of the projection light in the first liquid crystal device according to a control signal indicating that the first projector performs mirror reversal of the right-eye image, input from the first projector, and the second controller performs control for mirror-reversing the polarization direction of the projection light in the second liquid crystal device according to a control signal indicating that the second projector performs mirror reversal of the left-eye image, input from the second projector.

With the above configuration, according to the aspect of the invention, even in the case of a configuration in which each projection light for the right-eye image and the left-eye image is output from each of the first projector and the second projector that are different from each other, using a mechanism in which a viewer controls mirror-reversal of images generally installed in a projector, the control of mirror-reversal of the polarization direction of the projection light projected onto a screen by each of the first polarization controller and the second polarization controller corresponding to each of the first projector and the second projector is performed using a switching signal indicating whether the horizontal reversal of the image output from each of the first projector and the second projector is performed as a control signal. Thus, it is not necessary for the viewer to perform switching the polarization directions of the projection lights according to whether the number of reflections of the projection lights is even or odd, and thus, it is easy for the viewer to use the projector system. Further, it is possible to simplify the configuration of the projector system.

Still further another aspect of the invention is directed to a projector system including: a first projector that outputs a projection light for any one of a right-eye image and a left-eye image; a second projector that outputs a projection light for an image that is not projected by the first projector, among the right-eye image and the left-eye image; a first polarization controller that is provided corresponding to the first projector and polarizes a polarization direction of the projection light output from the first projector into a first polarization direction; and a second polarization controller that is provided corresponding to the second projector and polarizes a polarization direction of the projection light from the second projector into a second polarization direction different from the first polarization direction, wherein a control is performed so that the image projected from the first projector is changed from one of the right-eye image and the left-eye image into the other thereof and the image projected from the second projector is changed from the other of the right-eye image and the left-eye image into the one thereof according to a control signal indicating whether to perform mirror-reversal.

Yet further another aspect of the invention is directed to an image control method of performing selection so that each projection light for a right-eye image and a left-eye image is projected from any one of a first projector and a second projector, the method including: performing control so that the image projected from the first projector is changed from one of the right-eye image and the left-eye image into the other thereof and the image projected from the second projector is changed from the other of the right-eye image and the left-eye image into the one thereof, in association with a mirror-reversal process of the images in the first and second projectors, according to a control signal indicating whether to perform mirror-reversal of the images output from the first and second projectors.

With the above configuration, according to the aspects of the invention, even in the case of a configuration in which the first polarization controller maintains a state where the projection light output from the first projector is polarized into the first polarization direction and the second polarization controller maintains a state where the projection light output from the second projector is polarized into the second polarization direction, using a mechanism in which a viewer controls mirror-reversal of images generally installed in a projector, the control of switching the settings of the right-eye image and the left-eye image respectively projected from the first projector and the second projector is performed using a switching signal indicating whether the horizontal reversal of the image output from each of the first projector and the second projector is performed as a control signal. Thus, it is not necessary for the viewer to perform switching for displaying a certain one of the right-eye image and the left-eye image on a certain one of the first and second projectors according to whether the number of reflections of the projection lights is even or odd, and thus, it is easy for the viewer to use the projector system. Further, it is possible to simplify the configuration of the projector system.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
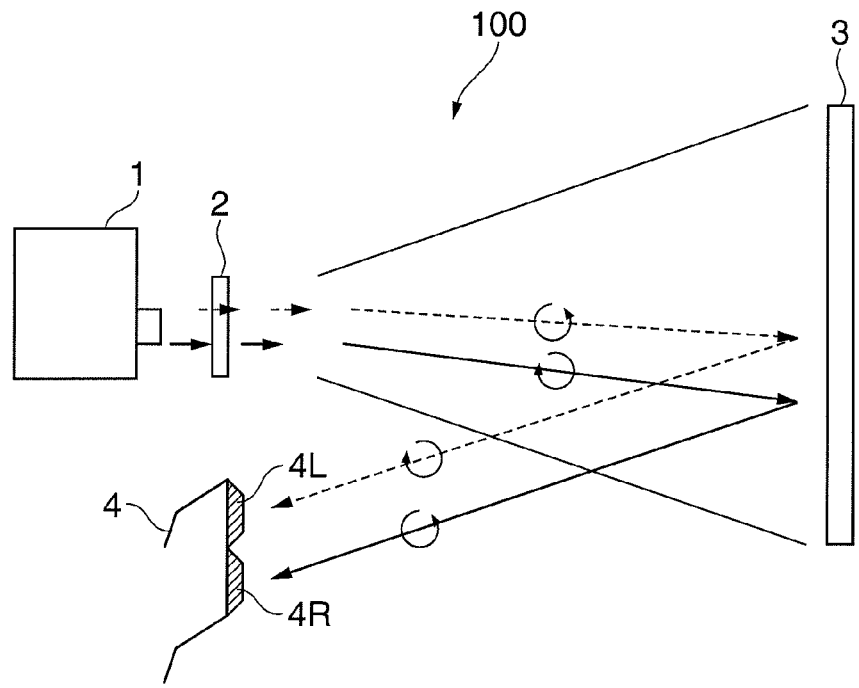
FIG. 1 is a block diagram schematically illustrating a configuration example of a projector system according to a first embodiment of the invention.

Hereinafter, a first embodiment of the invention will be described with reference to the accompanying drawings. FIG. 1 is a block diagram schematically illustrating a configuration example of a projector system 100 according to the first embodiment of the invention. In FIG. 1, the projector system 100 includes a projector 1, a polarization controller 2, a screen 3, and polarization glasses 4.

The projector 1 alternately outputs respective left-eye image data and right-eye image data that are sequentially input from an external device in a time division manner as respective projection lights for a left-eye image and a right-eye image. The projector 1 outputs the projection lights for the left-eye image and the right-eye image as linearly polarized lights in the present embodiment.

The polarization controller 2 performs a conversion process of converting polarizing directions of the respective projection lights for the left-eye image and the right-eye image that are incident from the projector 1 into (predetermined) polarization directions corresponding to the respective left-eye image and the right-eye image, and outputs the projection lights after conversion. For example, in the present embodiment, the polarization controller 2 polarizes the respective left-eye image and the right-eye image into a left-handed circularly polarized light and a right-handed circularly polarized light that are different polarization directions.

The screen 3 reflects the respective projection lights for the left-eye image and the right-eye image that are incident from the polarization controller 2 on a screen surface, and outputs the reflected lights as projection lights in which the polarization directions are horizontally reversed (that is, mirror-reversed).

The polarization glasses 4 include an optical device that transmits the right-handed circularly polarized light to a left eye glass 4L, and an optical device that transmits the left-handed circularly polarized light to a right eye glass 4R.

Thus, in the present embodiment, the respective projection lights for the left-eye image and the right-eye image that are alternately output from the projector 1 enter the left eye and the right eye of a viewer through the polarization glasses 4, respectively, thereby causing the viewer to view a three-dimensional image.

In this way, the above-mentioned projector system 100 has a configuration based on the assumption that the respective projection lights for the left-eye image and the right-eye image that are output from the projector 1 are reflected by the screen 3 once and the polarization directions of the polarized lights output from the polarization controller 2 are horizontally reversed.

However, as described above, in the case of a rear projection that uses a projector or a front projection in which the number of reflections is even, the projection lights output from the polarization controller 2 reaches the polarization glasses 4 in a state where the polarization directions thereof are not reversed. In this case, as described above, the polarization directions of the projection lights are opposite to the transmission characteristics of the left eye glass and the right eye glass of the polarization glasses 4, and thus, the projection light for the right-eye image enters the left eye of the viewer and the projection light for the left-eye image enters the right eye of the viewer. Thus, the viewer views the three-dimensional image in which the depth perception is reversed.

Accordingly, in a case where the number of reflections is odd, with respect to the polarization directions of the incident projection lights, the polarization controller 2 according to the present embodiment polarizes the projection light for the right-eye image into the right-handed circularly polarized light for output and polarizes the projection light for the left-eye image into the left-handed circularly polarized light for output, from the linearly polarized lights. Thus, with respect to the polarization directions of the optical devices of the left eye glass 4L and the right eye glass 4R of the polarization glasses 4, the polarization directions of the projection lights are horizontally reversed.

On the other hand, in a case where the number of reflections is even, with respect to the polarization directions of the incident projection lights, the polarization controller 2 polarizes the projection light for the right-eye image into the left-handed circularly polarized light for output and polarizes the projection light for the left-eye image into the right-handed circularly polarized light for output, from the linearly polarized lights. Thus, with respect to the polarization directions of the optical devices of the left eye glass 4L and the right eye glass 4R of the polarization glasses 4, the polarization directions of the projection lights are not horizontally reversed.

The projector 1 outputs a switching control signal for instruction of switching of the polarization directions, including image identification information indicating any one of the right-eye image and the left-eye image, to the polarization controller 2 in each switching period of the projection light for the left-eye image and the projection light of the right-eye image that are output in a time division manner.

Further, the switching control signal includes information indicating a horizontal reversal process of instructing the respective left-eye image and right-eye image to be horizontally reversed (mirror-reversed). Here, in a case where the number of reflections of the projection lights is even, the images output by the projector 1 are not horizontally reversed, but in a case where the number of reflections is odd, the images output by the projector 1 are horizontally reversed. Thus, the viewer performs a setting of controlling the horizontal reversal of the images output from the projector 1 corresponding to the number of reflections, with respect to the projector 1. According to the viewer's setting of the horizontal reversal, the projector 1 adds information indicating that the horizontal reversal process of the images is to be performed to the switching control signal in a case where the number of reflections is odd and adds information indicating that the horizontal reversal process of the images is not to be performed to the switching control signal in a case where the number of reflections is even, and outputs the result to the polarization controller 2.

Figure 2:
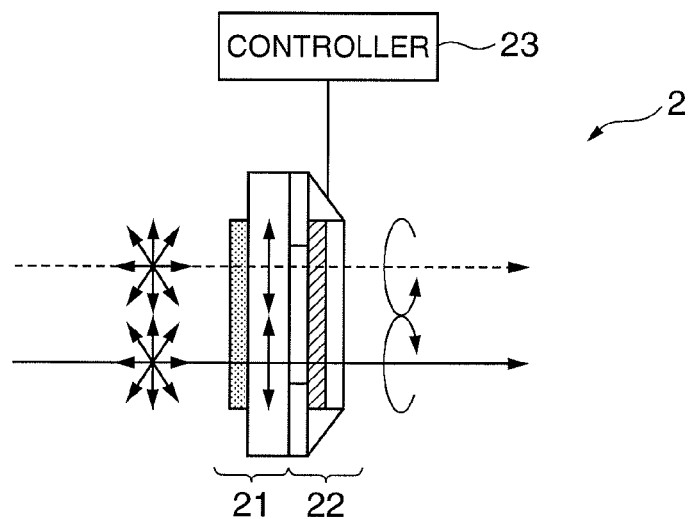
FIG. 2 is a diagram illustrating a configuration example of a polarization controller according to the embodiment.

Next, FIG. 2 is a diagram illustrating a configuration example of the polarization controller 2 according to the present embodiment. FIG. 2 shows a cross-sectional structure of the polarization controller 2.

The polarization controller 2 according to the present embodiment is configured by an active phase difference plate that includes a polarization plate 21 and a liquid crystal device 22. In the present embodiment, with respect to the right-handed circularly polarized light of the left eye glass 4L and the left-handed circularly polarized light of the right eye glass 4R in the polarization glasses 4, a case in which the polarization controller 2 polarizes the projection light for the left-eye image into the left-handed circularly polarized light and polarizes the projection light for the right-eye image into the right-handed circularly polarized light will be described as the horizontal reversal (mirror reversal) process.

The polarization plate 21 has a transmission axis that coincides with the polarization directions of the linearly polarized lights that are the projection lights of the images output from the projector 1, and outputs only the lights of the linearly polarized lights output from the projector 1 to the liquid crystal device 22 at the next stage.

The liquid crystal device 22 has a configuration in which liquid crystal elements are arranged therein, has a slow axis with an angle of 45° with respect to the polarization directions of the linearly polarized lights as described above, and switches a phase difference in the thickness direction thereof into any one of $\lambda/4$ and $-\lambda/4$ with a controller 23 (which will be described later).

The controller 23 controls the liquid crystal device 22 to convert the projection light for the left-eye image into the left-handed circularly polarized light from the linearly polarized light and to convert the projection light for the right-eye image into the right-handed circularly polarized light from the linearly polarized light, on the basis of the image identification information, by the switching control signal supplied from the projector 1, in a case where the switching control signal is an instruction indicating that the horizontal reversal process is to be performed.

On the other hand, the controller 23 controls the liquid crystal device 22 to convert the projection light for the left-eye image into the right-handed circularly polarized light from the linearly polarized light and to convert the projection light for the right-eye image into the left-handed circularly polarized light from the linearly polarized light, on the basis of the image identification information, with the switching control signal supplied from the projector 1, in a case where the switching control signal is an instruction indicating that the horizontal reversal process is not to be performed.

Thus, in the case of the rear projection or the front projection in which the number of reflections is even (hereinafter, referred to as "the number of reflections is even"), the polarization controller 2 converts the polarization directions so that the polarization direction of the left-eye image becomes the right-handed circular polarization that is the same as the polarization direction of the left eye glass 4L of the polarization glasses 4 and the polarization direction of the right-eye image becomes the left-handed circular polarization that is the same as the polarization direction of the right eye glass 4R of the polarization glasses 4.

Further, in the case of the front projection in which the number of reflections is odd (hereinafter, referred to as "the number of reflections is odd"), the polarization controller 2 converts the polarization directions so that the polarization direction of the left-eye image becomes the left-handed circular polarization that is different from the polarization direction of the left eye glass 4L of the polarization glasses 4 and the polarization direction of the right-eye image becomes the right-handed circular polarization that is different from the polarization direction of the right eye glass 4R of the polarization glasses 4.

That is, the polarization controller 2 performs the polarization process so that the polarization directions of the respective projection lights of the left-eye image and the right-eye image coincide with the respective polarization directions of the left eye glass 4L and the right eye glass 4R of the polarization glasses 4, in a case where the number of reflections is even, and performs the polarization process so that the polarization directions of the respective projection lights of the left-eye image and the right-eye image are reversed with respect to the respective polarization directions of the left eye glass 4L and the right eye glass 4R of the polarization glasses 4, in a case where the number of reflections is odd.

Instead of the above-mentioned liquid crystal device 22, a mechanical light modulation device that retracts an arbitrary phase difference plate rather than the liquid crystal device, a light modulation device that switches phase difference plates of arbitrary liquid crystal devices of two or more types, or a phase difference conversion device other than the liquid crystal device may be used.

Further, in a case where only the lights in which the polarization states of the lights output from the projector 1 are aligned with the polarization directions necessary for polarization of the liquid crystal device 22 are incident, the polarization plate 21 may be omitted.

The polarization controller 2 may be configured as a device that is separate from the projector 1, as shown in FIG. 1, or may be built in the projector 1.

Figure 3:
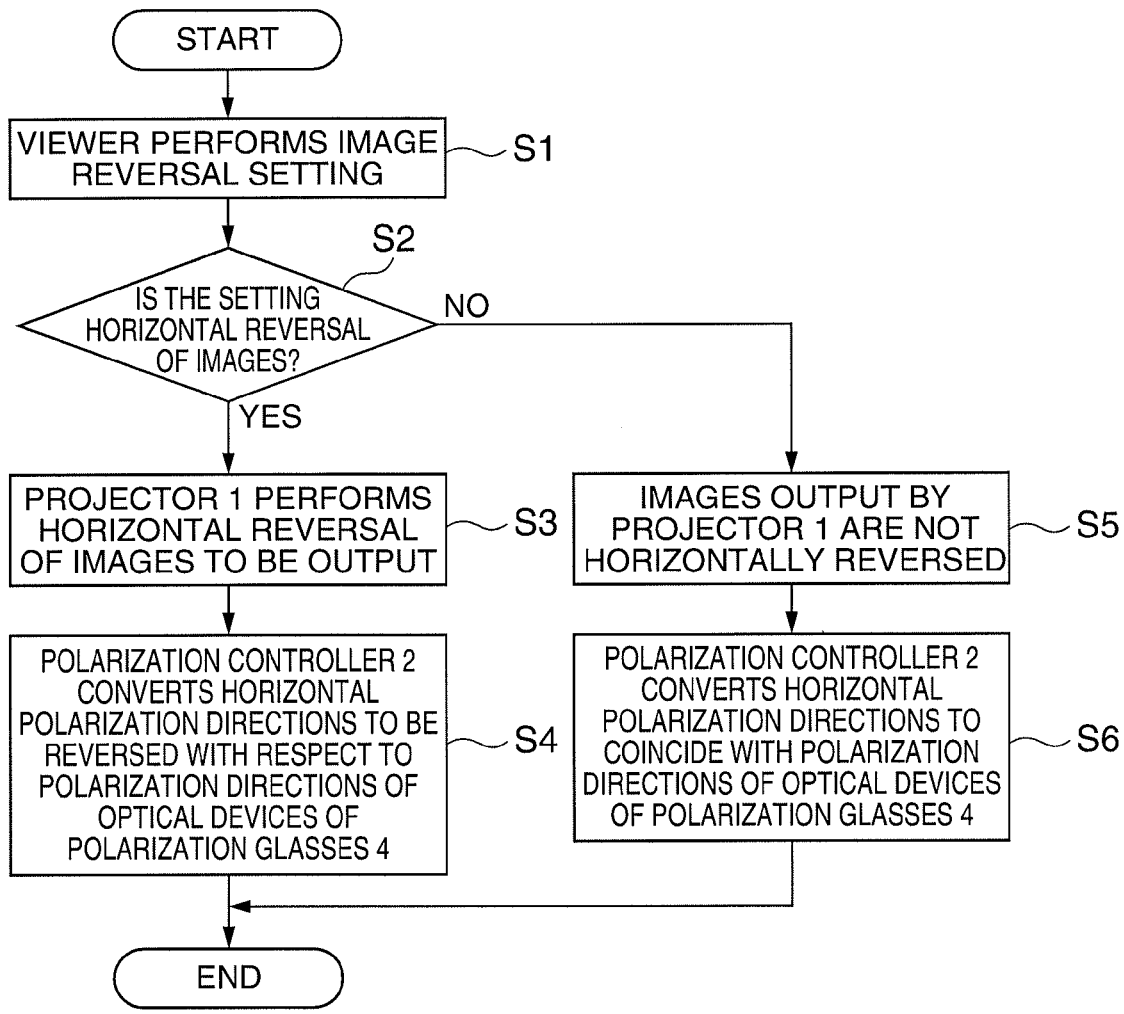
FIG. 3 is a flowchart illustrating a polarization control operation of the polarization controller in the projector system according to the first embodiment.

Next, FIG. 3 is a flowchart illustrating a polarization control operation of the polarization controller 2 in the projector system 100 according to the first embodiment.

Normally, in a case where the number of reflections of the projection lights is even and in a case where the number of reflections of the projection lights is odd, a viewer performs a setting of whether to perform the horizontal reversal of images to be viewed, with respect to the projector 1. That is, in a case where the number of reflections of the projection lights is even, the viewer can view the images output from the projector 1 as images that are not reversed. On the other hand, in a case where the number of reflections of the projection lights is odd, the viewer can view the images output from the projector 1 as images that are horizontally reversed as if they are reflected on a mirror.

Thus, it is necessary for the viewer to perform setting of whether the image projected from the projector 1 is reversed or not according to the configuration of the projector 1 that corresponds to any one of the cases where the number of reflections of the projection lights is even and odd.

Accordingly, in the present embodiment, with respect to the setting for performing the horizontal reversal of the images according to whether the number of reflections of the projection lights is even or odd is synchronized with the process of performing the horizontal reversal of the polarization directions according to whether the number of reflections of the projection lights is even or odd. As a result, the projector system 100 is configured so that if the viewer sets the horizontal reversal process of the images with respect to the projector 1, the horizontal reversal process of the polarization directions in the polarization controller 2 is performed at the same time. The polarization control operation of the polarization controller 2 will be described with reference to the flowchart in FIG. 3.

Step S1

The viewer performs a setting of whether to perform the horizontal reversal of images to be viewed with respect to the projector 1. Here, the viewer performs the setting of whether to perform the horizontal reversal by an input unit provided in the projector 1, for example, a switch, a menu screen displayed in a projected image, or a selection button of a window displayed on an operational liquid crystal panel (not shown) of the projector 1.

Step S2

The projector 1 determines whether the viewer's setting of the horizontal reversal is a setting indicating that the horizontal reversal of the images is not performed or a setting indicating that the horizontal reversal of the images is performed.

Here, the projector 1 transits the procedure to step S3 in a case where the viewer's setting of the horizontal reversal is the setting indicating that the horizontal reversal is performed, and advances the procedure to step S5 in a case where the viewer's setting of the horizontal reversal is the setting indicating that the horizontal reversal is not performed.

Step S3

Next, the projector 1 controls an internal image display device to perform the horizontal reversal process of the images, and then outputs the projection lights.

Further, the projector 1 outputs a switching control signal that includes image identification information about the left-eye image and the right-eye image and information indicating that the horizontal reversal process of the images is performed, in synchronization with a timing when one of the left-eye image and the right-eye image is switched to the other thereof for each display cycle, to the polarization controller 2.

Step S4

Next, in the polarization controller 2, if the switching control signal that includes the information indicating the horizontal reversal process is supplied from the projector 1, the controller 23 performs control switching of the liquid crystal device 22 according to the image identification signal in synchronization of the image switching timing, that is, a timing when the switching control signal is supplied.

Here, the controller 23 in the polarization controller 2 outputs a control signal for setting the phase difference of the liquid crystal device 22 to $-\lambda/4$ so that the linearly polarized light is polarized into the left-handed circularly polarized light, to the liquid crystal device 22, at a cycle when the projection light for the left-eye image is output.

Further, the controller 23 in the polarization controller 2 outputs a control signal for setting the phase difference of the liquid crystal device 22 to λ/4 so that the linearly polarized light is polarized into the right-handed circularly polarized light, to the liquid crystal device 22, at a cycle when the projection light for the right-eye image is output.

Further, the liquid crystal device 22 polarizes the projection light of the linearly polarized light supplied through the polarization plate 21 from the projector 1 from the linearly polarized light into the left-handed circularly polarized light for output in the case of the left-eye image, and polarizes the projection light of the linearly polarized light from the linearly polarized light into the right-handed circularly polarized light for output in the case of the right-eye image, according to the control signal supplied from the controller 23.

Thus, in a case where the number of reflections is odd, the polarization controller 2 converts the polarization directions of the respective projection lights for the left-eye image and the right-eye image into a horizontally reversed state with respect to the polarization directions of the respective optical devices of the left eye glass 4L and the right eye glass 4R in the polarization glasses 4, at the same time with the horizontal reversal of the images.

Step S5

Next, the projector 1 controls the internal image display device so that the horizontal reversal of the images is not performed, and then outputs the projection lights.

Further, the projector 1 outputs a switching control signal that includes the image identification information about the left-eye image and the right-eye image and information indicating that the horizontal reversal process of the images is not performed, in synchronization with the timing when one of the left-eye image and the right-eye image is switched to the other thereof for each display cycle, to the polarization controller 2.

Step S6

Next, in the polarization controller 2, if the switching control signal indicating that the horizontal reversal process is not performed is supplied from the projector 1, the controller 23 performs control switching of the liquid crystal device 22 according to the image identification signal in synchronization with the image switching timing, that is, a timing when the switching control signal is supplied.

Here, the polarization controller 2 outputs a control signal for setting the phase difference of the liquid crystal device 22 to λ/4 so that the linearly polarized light is polarized into the right-handed circularly polarized light, to the liquid crystal device 22, at a cycle when the projection light for the left-eye image is output.

Further, the polarization controller 2 outputs a control signal, for setting the phase difference of the liquid crystal device 22 to −λ/4 so that the linearly polarized light is polarized into the left-handed circularly polarized light, to the liquid crystal device 22, at a cycle when the projection light for the right-eye image is output.

That is, the polarization controller 2 polarizes the projection light for the left-eye image incident from the projector 1 into the right-handed circularly polarized light, and polarizes the projection light for the right-eye image incident from the projector 1 into the left-handed circularly polarized light, and outputs the results, respectively.

Further, the liquid crystal device 22 polarizes the projection light of the linearly polarized light supplied through the polarization plate 21 from the projector 1 from the linearly polarized light into the right-handed circularly polarized light for output in the case of the left-eye image, and polarizes the projection light of the linearly polarized light from the linearly polarized light into the left-handed circularly polarized light for output in the case of the right-eye image.

Thus, in a case where the horizontal reversal of the images is not performed in the case of the rear projection or in a case where the number of reflections is even, the polarization controller 2 converts the polarization directions of the respective projection lights for the left-eye image and the right-eye image into a state that is not horizontally reversed with respect to the polarization directions of the respective optical devices of the left eye glass 4L and the right eye glass 4R in the polarization glasses 4.

As described above, according to the present embodiment, the polarization controller 2 is able to convert the polarization directions of the projection lights so that the polarization directions of the respective projection lights for the left-eye image and the right-eye image that enter the polarization glasses 4 correspond to the transmission characteristics of the respective optical devices of the left eye glass 4L and the right eye glass 4R of the polarization glasses 4 so that the left-eye image enters the left eye of the viewer and the right-eye image enters the right eye of the viewer, respectively, according to whether the number of reflections is even or odd in association with the viewer's setting of the horizontal reversal process of the images with respect to the projector 1.

Thus, according to the present embodiment, it is not necessary for the viewer to perform the process of changing the setting of the polarization directions of the polarization controller 2 with respect to the polarization directions of the optical devices of the polarization glasses 4 according to whether the number of reflections is even or odd, for example, and the viewer has only to perform the process of setting only the horizontal reversal of the images, thereby making it easy to use the polarization controller.

Further, according to the present embodiment, since the settings of performing the horizontal reversal of the images and the horizontal reversal of the polarization directions of the projection lights are performed by the same input unit, it is possible to simplify the configuration of the setting input unit without increase in the number of input units.

Second Embodiment

Figure 4:
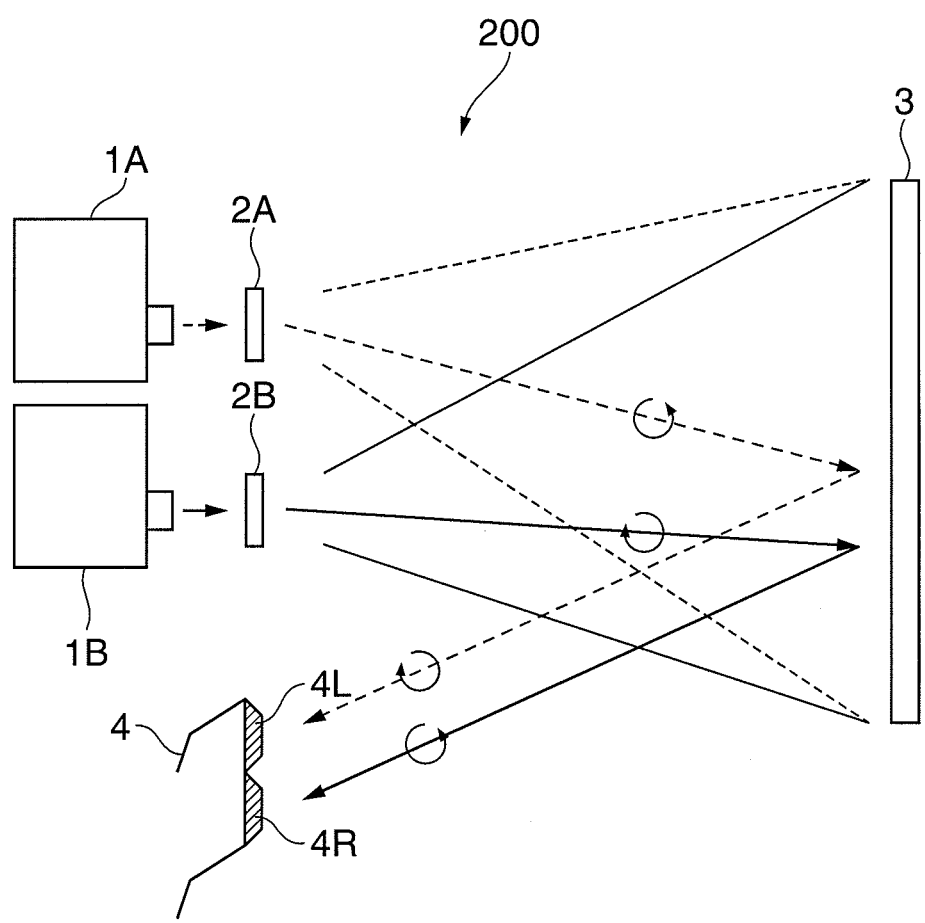
FIG. 4 is a block diagram schematically illustrating a configuration example of a projector system according to a second embodiment of the invention.

Hereinafter, a second embodiment of the invention will be described with reference to the accompanying drawings. FIG. 4 is a block diagram schematically illustrating a configuration example of a projector system 200 according to the second embodiment of the invention. In FIG. 4, the projector system 200 includes a projector 1A, a projector 1B, a polarization controller 2A, a polarization controller 2B, a screen 3, and polarization glasses 4.

The projector 1A extracts left-eye image data from left-eye image data and right-eye image data that are sequentially input from an external device by left eye identification information included in the left-eye image data, and outputs a projection light for the extracted left-eye image as a linearly polarized light in the present embodiment, for example.

The projector 1B extracts the right-eye image data from the left-eye image data and the right-eye image data that are sequentially input from the external device by right eye identification information included in the right-eye image data, and outputs a projection light for the extracted right-eye image as a linearly polarized light in the present embodiment, for example.

The polarization controller 2A performs a conversion process of converting the polarizing direction of the projection light for the left-eye image, incident from the projector 1A, into a polarization direction corresponding to the left-eye image, and outputs the projection light after conversion.

The polarization controller 2B performs a conversion process of converting the polarizing direction of the projection light for the right-eye image incident from the projector 1B into a polarization direction corresponding to the right-eye image, and outputs the projection light after conversion.

The screen 3 reflects the projection lights that are output from the respective polarization controllers 2A and 2B on a screen surface, and outputs the reflected lights as projection lights. The polarization direction of the respective projection lights for the left-eye image and the right-eye image turns over in a horizontal direction by reflecting with the screen 3.

The polarization glasses 4 have the same configuration as that of the first embodiment.

According to the configuration of the above-mentioned projector system 200, the projection light for the left-eye image output from the projector 1A enters the left eye through the left eye glass 4L of the polarization glasses 4, and the projection light for the right-eye image output from the projector 1B enters the right eye through the right eye glass 4R of the polarization glasses 4, thereby causing the viewer to view a three-dimensional image.

The above-mentioned projector system 200, for example, in a similar way to the first embodiment, has a configuration based on the assumption that the respective polarization directions of the projection light for the left-eye image that is reflected by the screen 3 once (the number of reflections is odd), that is, that is output from the projector 1A and the projection light for the right-eye image that is output from the projector 1B are horizontally reversed until the projection lights reach the polarization glasses 4 after being projected from the respective polarization controllers 2A and 2B.

However, as described above, in a case where two different projectors 1A and 1B are used, in the case of the front projection in which the number of reflections is even, the projection lights output from the projectors 1A and 1B reach the polarization glasses 4 in a state where the polarization directions of the projection lights are not reversed from the polarization directions of the projection lights output from the respective polarization controllers 2A and 2B. In this case, as described above, the projection light for the right-eye image enters the left eye of the viewer and the projection light for the left-eye image enters the right eye of the viewer. Thus, the viewer views a three-dimensional image in which depth perception is reversed.

Accordingly, in a case where the number of reflections is odd, the polarization controller 2A according to the present embodiment horizontally reverses the polarization direction of the projection light for the incident left-eye image with respect to the polarization direction where the optical device of the left eye glass 4L of the polarization glasses 4 transmits the projection light. That is, the polarization controller 2A outputs the linearly polarized light as the left-handed circularly polarized light.

On the other hand, in a case where the number of reflections is even, the polarization controller 2A causes the polarization direction of the projection light for the incident left-eye image to coincide with the polarization direction where the optical device of the left eye glass 4L of the polarization glasses 4 transmits the projection light. That is, the polarization controller 2A outputs the linearly polarized light as the right-handed circularly polarized light.

Similarly, in a case where the number of reflections is odd, the polarization controller 2B horizontally reverses the polarization direction of the projection light for the incident right-eye image with respect to the polarization direction where the optical device of the right eye glass 4R of the polarization glasses 4 transmits the projection light. That is, the polarization controller 2B outputs the linearly polarized light as the right-handed circularly polarized light.

On the other hand, in a case where the number of reflections is even, the polarization controller 2B causes the polarization direction of the projection light for the incident right-eye image to coincide with the polarization direction where the optical device of the right eye glass 4R of the polarization glasses 4 transmits the projection light. That is, the polarization controller 2B outputs the linearly polarized light as the left-handed circularly polarized light.

The projector 1A outputs a switching control signal including information indicating whether to perform the horizontal reversal process for the left-eye image to the polarization controller 2A in each switching period of the left-eye image to be output.

In a similar way to the projector 1A, the projector 1B outputs a switching control signal indicating whether to perform the horizontal reversal process for the right-eye image to the polarization controller 2B in each switching period of the right-eye image to be output.

Next, in the present embodiment, the polarization controllers 2A and 2B have the same configuration as that of the polarization controller 2 in the first embodiment shown in FIG. 2, respectively. Only operations different from those of the polarization controller 2 in the first embodiment will be described.

In a case where the number of reflections is odd, the polarization controller 2A outputs the projection light for the incident left-eye image so that the polarization direction of the projection light becomes the left-handed circular polarization that is different from the polarization direction of the optical device of the left eye glass 4L of the polarization glasses 4 (through the mirror reversal). On the other hand, in a case where the number of reflections is even, the polarization controller 2A outputs the projection light for the incident left-eye image so that the polarization direction of the projection light becomes the right-handed circular polarization that coincides with the polarization direction of the optical device of the left eye glass 4L of the polarization glasses 4.

Further, in a case where the number of reflections is odd, the polarization controller 2B according to the present embodiment outputs the projection light for the incident right-eye image so that the polarization direction of the projection light becomes the right-handed circular polarization that is different from the polarization direction of the optical device of the right eye glass 4R of the polarization glasses 4 (through the mirror reversal). On the other hand, in a case where the number of reflections is even, the polarization controller 2B outputs the projection light for the incident right-eye image so that the polarization direction of the projection light becomes the left-handed circular polarization that coincides with the polarization direction of the optical device of the right eye glass 4R of the polarization glasses 4.

That is, in the case of the rear projection or the front projection in which the number of reflections is even, the polarization controller 2A controls the polarization direction of the projection light for the left-eye image so that the polarization direction of the projection light for the left-eye image coincides with the polarization direction where the optical device in the left eye glass 4L of the polarization glasses 4 transmits the projection light, and in the case of the front projection in which the number of reflections is odd, the polarization controller 2A controls the polarization direction of the projection light for the left-eye image so that the polarization direction of the projection light for the left-eye image and the polarization direction where the optical device in the left eye glass 4L of the polarization glasses 4 transmits the projection light are horizontally reversed.

Further, in the case of the rear projection or the front projection in which the number of reflections is even, the polarization controller 2B controls the polarization direction of the projection light for the right-eye image so that the polarization direction of the projection light for the right-eye image coincides with the polarization direction where the optical device in the right eye glass 4R of the polarization glasses 4 transmits the projection light, and in the case of the front projection in which the number of reflections is odd, the polarization controller 2B controls the polarization direction of the projection light for the right-eye image so that the polarization direction of the projection light for the right-eye image and the polarization direction where the optical device in the right eye glass 4R of the polarization glasses 4 transmits the projection light are horizontally reversed.

Figure 5:
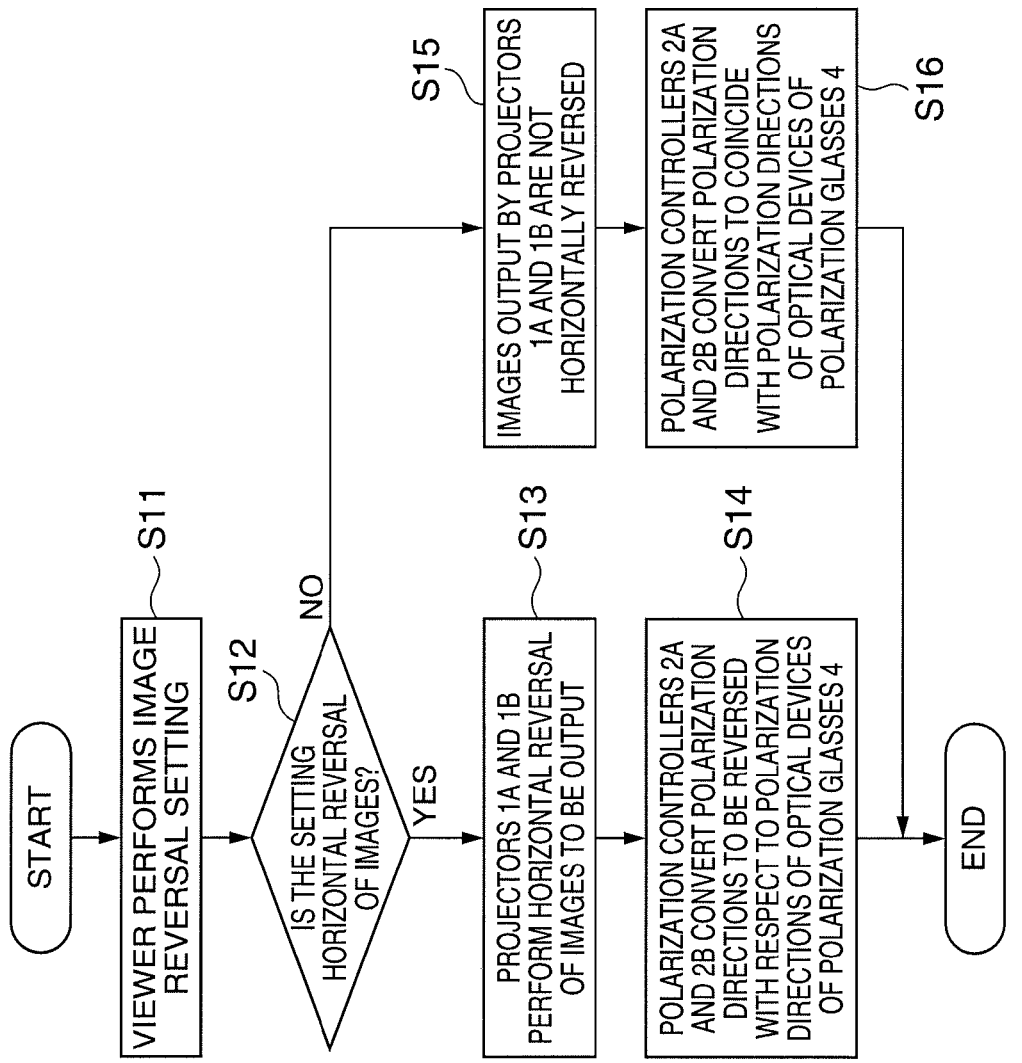
FIG. 5 is a flowchart illustrating a polarization control operation of polarization controllers in the projector system according to the second embodiment.

Next, FIG. 5 is a flowchart illustrating a polarization control operation of the polarization controllers 2A and 2B in the projector system 200 according to the second embodiment.

Normally, a viewer performs a setting of whether to perform a horizontal reversal for images to be viewed, with respect to the respective projectors 1A and 1B in a case where the number of reflections of the projection lights is even and in a case where the number of reflections of the projection lights is odd, in a similar way to the first embodiment. That is, in a case where the number of reflections of the projection lights is even, the viewer can view images output from the respective projectors 1A and 1B as images that are not reversed. On the other hand, in a case where the number of reflections of the projection lights is odd, the viewer can view the images output from the respective projectors 1A and 1B as images that are horizontally reversed as if they are reflected on a mirror.

Thus, it is necessary to perform a setting of whether to reverse the images projected from the respective projectors 1A and 1B according to the configuration of the projector system 200 that corresponds to any one of the cases where the number of reflections of the projection lights is even and odd.

Accordingly, in the present embodiment, a configuration is used in which the setting of performing the horizontal reversal of the images according to whether the number of reflections of the projection lights is even or odd is synchronized with the process of performing the horizontal reversal of the polarization directions according to whether the number of reflections of the projection lights is even or odd. As a result, the projector system 200 is configured so that if the viewer sets the horizontal reversal process of the images with respect to the projector 1, the horizontal reversal process of the polarization directions of the respective polarization controllers 2A and 2B is performed in association with the respective projectors 1A and 1B. Hereinafter, the polarization control operation of the polarization controllers 2A and 2B will be described with reference to a flowchart in FIG. 5.

Step S11

The viewer performs the setting of whether to perform the horizontal reversal of the images to be viewed with respect to the respective projectors 1A and 1B. Here, the viewer performs the setting of whether to perform the horizontal reversal with an input unit provided in each of the projectors 1A and 1B, for example, a switch, a menu screen displayed in a projected image, or a selection button of a window displayed in an operational liquid crystal panel (not shown) of each of the projectors 1A and 1B.

Step S12

The respective projectors 1A and 1B perform a determination of whether the viewer's setting of the horizontal reversal is a setting indicating that the horizontal reversal of the images is not performed or a setting indicating that the horizontal reversal is performed.

Here, in a case where the viewer's setting of the horizontal reversal indicates that the horizontal reversal is performed, the respective projectors 1A and 1B transit the procedure to step S13, and in a case where the viewer's setting of the horizontal reversal indicates that the horizontal reversal is not performed, the projectors 1A and 1B transit the procedure to step S15.

Step S13

Next, each of the projectors 1A and 1B controls an internal image display device to perform a horizontal reversal process of the image, and outputs the projection light.

Further, the projector 1A outputs a switching control signal, that includes information indicating that the horizontal reversal of the polarization direction is performed in synchronization with a switching timing of the left-eye image, to the polarization controller 2A.

Similarly, the projector 1B outputs a switching control signal that includes information indicating that the horizontal reversal of the polarization direction is performed in synchronization with a switching timing of the right-eye image, to the polarization controller 2B.

Step S14

Next, in the polarization controller 2A, if the switching control signal that includes the information indicating the horizontal reversal process is supplied from the projector 1A, the controller 23 performs control switching of the liquid crystal device 22 in synchronization of the image switching timing, that is, a timing when the switching control signal is supplied.

Here, the polarization controller 2A outputs a control signal for setting the phase difference of the liquid crystal device 22 to $-\lambda/4$ so that the linearly polarized light is polarized into the left-handed circularly polarized light, to the liquid crystal device 22, at a cycle when the projection light for the left-eye image is output.

Similarly, in the polarization controller 2B, if the switching control signal that includes the information indicating the horizontal reversal process is supplied from the projector 1B, the controller 23 performs control switching of the liquid crystal device 22 in synchronization of the image switching timing, that is, a timing when the switching control signal is supplied.

Further, the polarization controller 2B outputs a control signal for setting the phase difference of the liquid crystal device 22 to $\lambda/4$, so that the linearly polarized light is polarized into the right-handed circularly polarized light, to the liquid crystal device 22, at a cycle when the projection light for the right-eye image is output.

Further, in the polarization controller 2A, the liquid crystal device 22 polarizes the projection light for the left-eye image supplied through the polarization plate 21 from the projector 1A by the control signal supplied from the controller 23 from the linearly polarized light into the left-handed circularly polarized light.

Further, in the polarization controller 2B, the liquid crystal device 22 polarizes the projection light for the right-eye image supplied through the polarization plate 21 from the projector 1B by the control signal supplied from the controller 23, from the linearly polarized light into the right-handed circularly polarized light.

Thus, in a case where the number of reflections is odd and the horizontal reversal of the images is performed, the polarization controller 2A converts the polarization direction of the projection light for the left-eye image to be horizontally reversed with respect to the polarization direction of the optical device of the left eye glass 4L in the polarization glasses 4, according to the information indicating that the horizontal reversal process of the image is performed, at the same time as the horizontal reversal of the image.

Similarly, in a case where the number of reflections is odd and the horizontal reversal of the images is performed, the polarization controller 2B converts the polarization direction of the projection light for the right-eye image to be horizontally reversed with respect to the polarization direction of the optical device of the right eye glass 4R in the polarization glasses 4, according to the information indicating that the horizontal reversal process of the image is performed, at the same time as the horizontal reversal of the image.

Step S15

Next, each of the projectors 1A and 1B controls the internal image display device to output the projection light for the image without performing the horizontal reversal process of the image.

Further, in a case where the horizontal reversal for the left-eye image is not performed, the projector 1A outputs the switching control signal including the information indicating that the horizontal reversal of the polarization directions of the projection light for the left-eye image is not performed in synchronization with the image switching timing, to the polarization controller 2A.

Similarly, in a case where the horizontal reversal for the right-eye image is not performed, the projector 1B outputs the switching control signal including the information indicating that the horizontal reversal of the right-eye image is not performed in synchronization with the right image switching timing of the right-eye image, to the polarization controller 2B.

Step S16

Next, in the polarization controller 2A, if the switching control signal that includes the information indicating that the horizontal reversal process is not performed is supplied from the projector 1A, the controller 23 performs control switching of the liquid crystal device 22 corresponding to the image identification signal in synchronization of the image switching timing, that is, a timing when the switching control signal is supplied.

At this time, when the projection light for the left-eye image is output, the polarization controller 2A outputs a control signal for setting the phase difference of the liquid crystal device 22 to $\lambda/4$ so that the linearly polarized light is polarized into the right-handed circularly polarized light, to the liquid crystal device 22.

Similarly, in the polarization controller 2B, if the switching control signal that includes the information indicating that the horizontal reversal process is not performed is supplied from the projector 1B, the controller 23 performs control switching of the liquid crystal device 22 corresponding to the image identification signal in synchronization with the image switching timing, that is, a timing when the switching control signal is supplied.

Here, when the projection light for the right-eye image is output, the polarization controller 2B outputs a control signal for setting the phase difference of the liquid crystal device 22 to $-\lambda/4$ so that the linearly polarized light is polarized into the left-handed circularly polarized light with respect to the liquid crystal device 22.

Further, in the polarization controller 2A, the liquid crystal device 22 polarizes the projection light for the left-eye image supplied through the polarization plate 21 from the projector 1A, from the linearly polarized light into the right-handed circularly polarized light for output.

On the other hand, in the polarization controller 2B, the liquid crystal device 22 polarizes the projection light for the right-eye image supplied through the polarization plate 21 from the projector 1B, from the linearly polarized light into the left-handed circularly polarized light for output.

Thus, in the case of the rear projection or in a case where the number of reflections is even, the respective polarization controllers 2A and 2B convert the polarization directions of the respective projection lights for the left-eye image and the right-eye image into polarization directions that coincide with the polarization directions of the respective optical devices of the left eye glass 4L and the right eye glass 4R in the polarization glasses 4. That is, the polarization controller 2A converts the projection light for the left-eye image incident from the projector 1A into the right-handed circularly polarized light for output, and the polarization controller 2B converts the projection light for the right-eye image incident from the projector 1B into the left-handed circularly polarized light for output, respectively.

As described above, according to the present embodiment, the respective polarization controllers 2A and 2B are able to convert the polarization directions of the projection lights so that the polarization directions of the respective projection lights for the left-eye image and the right-eye image that enter the polarization glasses 4 correspond to the transmission characteristics of the respective optical devices of the left eye glass 4L and the right eye glass 4R of the polarization glasses 4 so that the left-eye image enters the left eye of the viewer and the right-eye image enters the right eye of the viewer, respectively, according to whether the number of reflections is even or odd in association with the viewer's setting of the horizontal reversal process of the images with respect to the projectors 1A and 1B.

Thus, according to the present embodiment, it is not necessary for the viewer to perform the process of changing the setting of the polarization directions of the polarization controllers 2A and 2B with respect to the polarization directions of the optical devices of the polarization glasses 4 according to whether the number of reflections is even or odd, for example, but the viewer has only to perform the process of setting only the horizontal reversal of the images, thereby making it easy to use the polarization controllers.

Further, according to the present embodiment, since the setting of performing the horizontal reversal of the images and the horizontal reversal of the polarization directions of the projection lights are performed by the same input unit, it is possible to simplify the configuration of the setting input unit without an increase in the number of input units.

Third Embodiment

Hereinafter, a third embodiment of the invention will be described with reference to the accompanying drawing. A projector system according to the present embodiment has the same configuration as that of the projector system 200 according to the second embodiment shown in FIG. 4, but a polarization control operation of the polarization controllers 2A and 2B is different from that of the second embodiment.

Next, only operations of the present embodiment that are different from those of the second embodiment will be described. In the second embodiment, in the case of the rear projection or in the case of the front projection where the number of reflections is even, and in the case of the front projection where the number of reflections is odd, when the polarization directions of the left-eye image and the right-eye image are reversed, the polarization controllers 2A and 2B are controlled. However, in the present embodiment, the polarization directions of the left-eye image and the right-eye image are reversed using a different control method with the same configuration. The control method is a method of exchanging images displayed by the projectors 1A and 1B, in the case of the rear projection or in the case of the front projection where the number of reflections is even, and in the case of the front projection where the number of reflections is odd.

That is, in a state where the projection lights for the images of the projectors 1A and 1B reach the polarization glasses 4 in different polarization directions and phase difference values given to the lights that pass through the polarization controllers 2A and 2B are fixed. Accordingly, when the case of the front projection where the number of reflections is odd and the case of the rear projection or the case of the front projection where the number of reflections is even are switched, by exchanging the images projected from the projectors 1A and 1B, the polarization directions of the projection lights of the left-eye image and the right-eye image are reversed without control of the polarization controllers.

Figure 6:
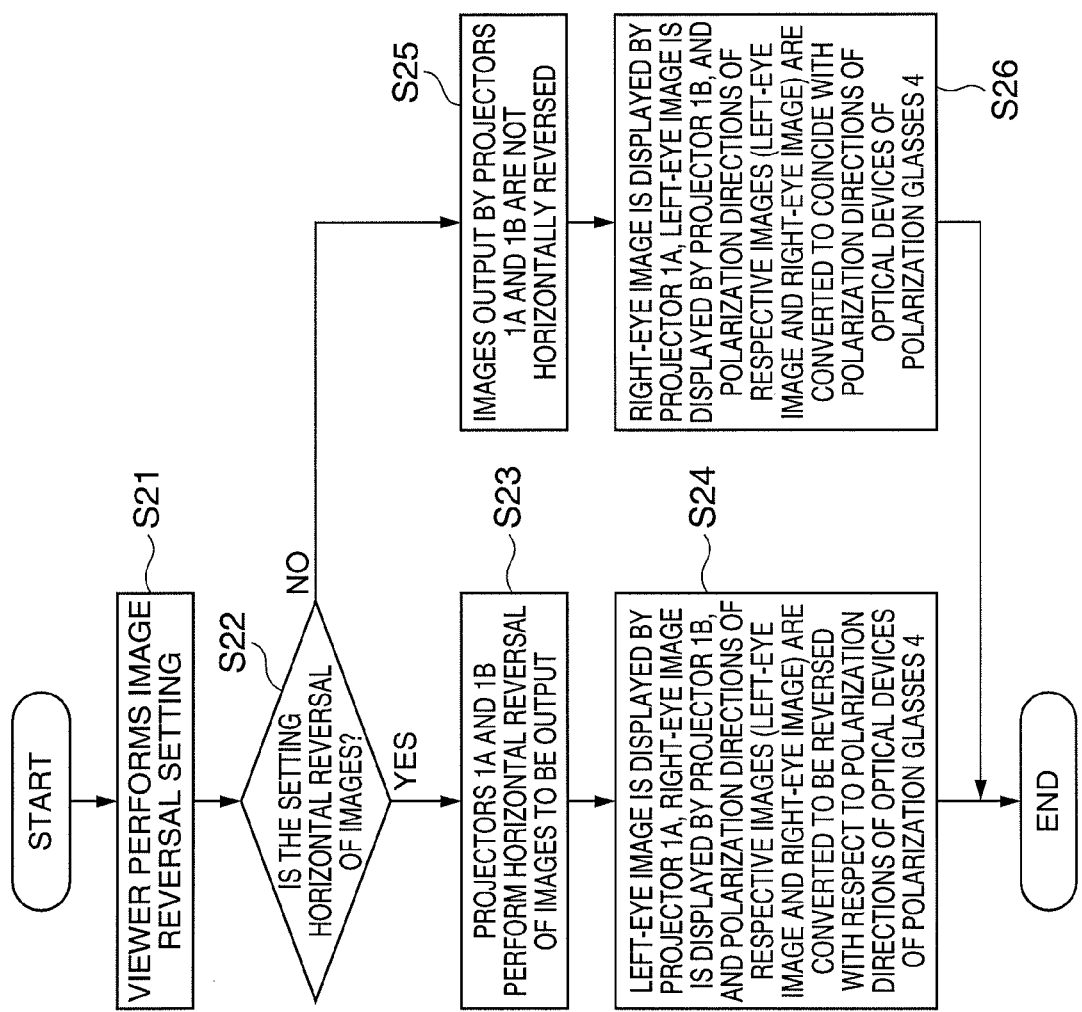
FIG. 6 is a flowchart illustrating an operation of an image controller in a projector system according to a third embodiment.

Next, FIG. 6 is a flowchart illustrating an operation of an image controller in the projector system 200 according to the third embodiment.

Normally, in a similar way to the first embodiment, in a case where the number of reflections of the projection lights is even and in a case where the number of reflections of the projection lights is odd, the viewer performs a setting on whether to perform the horizontal reversal of images to be viewed, with respect to the projector system 200. That is, in a case where the number of reflections of the projection lights is even, the viewer can view the images output from the respective projectors 1A and 1B as images that are not reversed. On the other hand, in a case where the number of reflections of the projection lights is odd, the viewer can view the images output from the respective projectors 1A and 1B as images that are horizontally reversed as if they are reflected in a mirror.

Thus, it is necessary for the viewer to perform setting of whether the image projected from the respective projectors 1A and 1B is reversed or not according to the configuration of the projector 1 that corresponds to any one of the cases where the number of reflections of the projection lights is even and odd.

Accordingly, in the present embodiment, a configuration is used in which the process of performing the horizontal reversal of the polarization directions according to whether the number of reflections of the projection lights is even or odd is synchronized with the setting of performing the horizontal reversal of the images according to whether the number of reflections of the projection lights is even or odd. As a result, the projector system 200 is configured so that if the viewer sets the horizontal reversal process of the images with respect to the projector system 200, the horizontal reversal process of the polarization directions of the left-eye image and the right-eye image is performed by exchanging the images output from the projectors 1A and 1B. In this regard, in the present embodiment, in the polarization controller 2A, the phase difference of the liquid crystal device 22 is fixed to $-\lambda/4$, in the polarization controller 2B, the phase difference of the liquid crystal device 22 is fixed to $\lambda/4$. Hereinafter, the operation of the polarization controllers will be described with reference to the flowchart in FIG. 6.

Step S21

The viewer performs a setting of whether to perform the horizontal reversal of images to be viewed with respect to the projector system 200. Here, the viewer performs the setting of whether to perform the horizontal reversal by an input unit provided in the projector system 200, for example, a switch, a menu screen displayed in a projected image, or a selection button of a window displayed on an operational liquid crystal panel (not shown) of the projectors 1A and 1B.

Step S22

The projector system 200 determines whether the viewer's setting of the horizontal reversal is a setting indicating that the horizontal reversal of the images is not performed or a setting indicating that the horizontal reversal of the images is performed.

Here, the projector system 200 advances the procedure to step S23 in a case where the viewer's setting of the horizontal reversal is the setting indicating that the horizontal reversal is performed, and advances the procedure to step S25 in a case where the viewer's setting of the horizontal reversal is the setting indicating that the horizontal reversal is not performed.

Step S23

Next, each of the projectors 1A and 1B controls an internal image display device to perform the horizontal reversal process of the image, and then outputs the projection light.

Further, the projector 1A sets an image extraction function to extract left-eye image data from left-eye image data and right-eye image data that are sequentially input from an external device by left eye identification information included in the left-eye image data and to output a projection light of the extracted left-eye image as a linearly polarized light in the embodiment, for example. The projector 1B sets an image extraction function to extract the right-eye image data from the left-eye image data and the right-eye image data that are sequentially input from the external device by right eye identification information included in the right-eye image data and to output a projection light of the extracted right-eye image as a linearly polarized light in the embodiment, for example.

Step S24

In the polarization controller 2A, the controller 23 outputs a control signal for constantly setting the phase difference of the liquid crystal device 22 to $-\lambda/4$. In the polarization controller 2B, the controller 23 outputs a control signal for constantly setting the phase difference of the liquid crystal device 22 to $\lambda/4$.

Accordingly, the left-eye image of the linearly polarized light output from the projector 1A is polarized into the left-handed circularly polarized light by the polarization controller 2A to be output. The right-eye image of the linearly polarized light output from the projector 1B is polarized into the right-handed circularly polarized light by the polarization controller 2B to be output.

Thus, in a case where the number of reflections is odd and the horizontal reversal of the images is performed, the projector 1A projects the horizontally reversed left-eye image toward the polarization controller 2A by information indicating that the horizontal reversal process of the images is performed, and the polarization controller 2A converts the polarization direction of the projection light for the left-eye image to be horizontally reversed with respect to the polarization direction of the optical device of the left eye glass 4L in the polarization glasses 4.

Similarly, in a case where the number of reflections is odd and the horizontal reversal of the images is performed, the projector 1B projects the horizontally reversed right-eye image toward the polarization controller 2B by the information indicating that the horizontal reversal process of the images is performed, and the polarization controller 2B converts the polarization direction of the projection light for the right-eye image to be horizontally reversed with respect to the polarization direction of the optical device of the right eye glass 4R in the polarization glasses 4.

Step S25

Next, each of the projectors 1A and 1B controls the internal image display device to output the projection light for the image without performing the horizontal reversal process of the image.

Further, the projector 1A sets an image extraction function to extract the right-eye image data from the left-eye image data and the right-eye image data that are sequentially input from the external device by the right eye identification information included in the right-eye image data and to output the projection light of the extracted right-eye image as the linearly polarized light in the embodiment, for example. The projector 1B sets an image extraction function to extract the left-eye image data from the left-eye image data and the right-eye image data that are sequentially input from the external device by the left eye identification information included in the left-eye image data and to output the projection light of the extracted left-eye image as the linearly polarized light in the embodiment, for example.

Step S26

In the polarization controller 2A, the controller 23 outputs a control signal for constantly setting the phase difference of the liquid crystal device 22 to $-\lambda/4$. In the polarization controller 2B, the controller 23 outputs a control signal for constantly setting the phase difference of the liquid crystal device 22 to $\lambda/4$.

Accordingly, the right-eye image of the linearly polarized light output from the projector 1A is polarized into the right-handed circularly polarized light by the polarization controller 2A to be output. The left-eye image of the linearly polarized light output from the projector 1B is polarized into the left-handed circularly polarized light by the polarization controller 2B to be output.

Thus, in the case of the rear projection or in a case where the number of reflections is even, in a case where the horizontal reversal of the images is not performed, the projector 1A projects the right-eye image that is not horizontally reversed toward the polarization controller 2A by information indicating that the horizontal reversal process of the images is not performed, and the polarization controller 2A converts the polarization direction of the projection light for the right-eye image into a polarization direction that coincides with the polarization direction of the optical device of the right eye glass 4R in the polarization glasses 4.

Similarly, in the case of the rear projection or in a case where the number of reflections is even, in a case where the horizontal reversal of the images is not performed, the projector 1B projects the left-eye image that is not horizontally reversed toward the polarization controller 2B by the information indicating that the horizontal reversal process of the images is not performed, and the polarization controller 2B converts the polarization direction of the projection light for the left-eye image into a polarization direction that coincides with the polarization direction of the optical device of the left eye glass 4L in the polarization glasses 4.

As described above, according to the present embodiment, it is possible to convert the polarization directions of the projected left-eye image and right-eye image by switching the image data extracted by the respective projectors 1A and 1B from the left eye image data and the right eye image data that are sequentially input from the external device so that the polarization directions of the respective projection lights for the left-eye image and the right-eye image that enter the polarization glasses 4 correspond to the transmission characteristics of the respective optical devices of the left eye glass 4L and the right eye glass 4R of the polarization glasses 4 so that the left-eye image enters the left eye of the viewer and the right-eye image enters the right eye of the viewer, respectively, according to whether the number of reflections is even or odd in association with the viewer's setting of the horizontal reversal process of the images with respect to the projectors 1A and 1B.

Thus, according to the present embodiment, it is not necessary for the viewer to perform the process of changing the setting of the image data extracted by the projectors 1A and 1B from the left eye image data and the right eye image data that are sequentially input from the external device with respect to the polarization directions of the optical devices of the polarization glasses 4 according to whether the number of reflections is even or odd, but the viewer has only to perform the process of setting only the horizontal reversal of the images, thereby making it easy to use the projector system.

Further, according to the present embodiment, since the settings of performing the horizontal reversal of the image and the horizontal reversal of the polarization direction of the projection light are performed by the same input unit, it is possible to simplify the configuration of the setting input unit without an increase in the number of input units.

Further, in the third embodiment, each of the polarization controllers 2A and 2B is configured as a device that is provided with the controller 23 and the liquid crystal device 22 and is capable of controlling the phase difference, but a phase difference plate in which the phase difference is fixed may be used instead of the liquid crystal device 22, with the controller 23 being removed. Since the phase difference plate is cheaper than the liquid crystal device and the controller is not necessary, it is possible to reduce the cost of the polarization controllers 2A and 2B.

In the second and third embodiments, a configuration is used in which the input unit that performs the setting of the horizontal reversal of the images is provided in each of the projectors 1A and 1B, but a configuration may be used in which the input unit is provided to one of the projectors 1A and 1B and information indicating whether the horizontal reversal is performed is supplied to the other thereof.

Further, the extraction (distribution) functions of the left-eye image and the right-eye image are provided in the respective projectors 1A and 1B, but the extraction function may be provided in any one projector, and the image corresponding to the other projector may be supplied to the other projector from the one projector. In this case, the one projector identifies the left-eye image and the right-eye image by the identification information of the left-eye image and the right-eye image, and then, in a case where a setting is performed so that the one projector outputs the left-eye image, the one projector supplies the right-eye image to the other projector. Further, the other projector outputs the projection light for the supplied right-eye image.

Further, the extraction (distribution) functions of the left-eye image and the right-eye image are provided in the respective projectors 1A and 1B, but the extraction functions may be independently provided in an external device, and the images corresponding to the respective projectors may be supplied by the external device. In this case, the external device identifies the left-eye image and the right-eye image by the identification information of the left-eye image and the right-eye image, and then, supplies the left-eye image to one projector and supplies the right-eye image to the other projector.

Further, in all of the first to third embodiments, even in the case of the linearly polarized light instead of the circularly polarized light, for example, even in the combination of the polarization directions of 45° and 135° that are different from each other by 90°, there is the same problem as that of the above-mentioned circularly polarized light.

In this configuration, in the case of the first embodiment, as the projection lights output from the projector 1, the left-eye image and the right-eye image are output as linearly polarized lights of the polarization directions having an angle of 45° with respect to the y axis (central line in mirror reversal), for example. Further, in the polarization controller 2, the polarization plate 21 has a transmission axis of 45°, and control is performed so that the angle of the polarization direction is converted by 90° into 135° using the liquid crystal device 22 or the angle of 45° is maintained as it is. Here, the polarization controller 2 controls the polarization directions of the respective projection lights of the right-eye image and the left-eye image according to whether the number of reflections is even or odd, as described above. Further, in the polarization glasses 4, the left eye glass 4L has a transmission axis of 135°, and the right eye glass 4R has a transmission axis of 45°.

On the other hand, in the case of the second embodiment, as the projection light output from the projector 1A, the left-eye image is output as a linearly polarized light of the polarization direction having an angle of 45° with respect to the y axis, for example. Further, as the projection light output from the projector 1B, the right-eye image is output as a linearly polarized light of the polarization direction having an angle of 135° with respect to the y axis, for example.

Further, in the polarization controller 2A, the polarization plate 21 has a transmission axis of 45°, and the controller 23 performs control so that the angle of the polarization direction is converted by 90° into 135° using the liquid crystal device 22 or the angle of 45° is maintained as it is. On the other hand, in the polarization controller 2B, the polarization plate 21 has a transmission axis of 135°, and the controller 23 performs control so that the angle of the polarization direction is converted by 90° into 45° using the liquid crystal device 22 or the angle of 135° is maintained as it is. Here, the respective polarization controllers 2A and 2B control the polarization directions of the respective projection lights of the right-eye image and the left-eye image according to whether the number of reflections is even or odd, as described above. Further, in the polarization glasses 4, the left eye glass 4L has a transmission axis of 135°, and the right eye glass 4R has a transmission axis of 45°.

On the other hand, in the case of the third embodiment, the projection light output from the projector 1A is a linearly polarized light of the polarization direction having an angle of 45° with respect to the y axis, for example. Further, the projection light output from the projector 1B is a linearly polarized light of the polarization direction having an angle of 135° with respect to the y axis, for example.

Further, the respective polarization controllers 2A and 2B control the polarization directions of the respective projection lights of the images (right-eye image and left-eye image) extracted by the respective projectors according to whether the number of reflections is even or odd, as described above. Further, in the polarization glasses 4, the left eye glass 4L has a transmission axis of 135°, and the right eye glass 4R has a transmission axis of 45°.

Further, a program for realizing the function of the controller 23 in FIG. 2 may be recorded on a computer-readable recording medium, and the program recorded on the recording medium may be read into a computer system to be executed, and thus, the control of converting polarization may be performed. Here, the "computer system" includes hardware such as an OS, peripherals or the like.

Further, if the WWW system is used, the "computer system" may include an environment that supplies a website (or display environment).

Further, the "computer-readable recording medium" refers to a storage device such as a transportable medium such as a floppy disk, a magneto-optical disc, a ROM or a CD-ROM, or a hard disk built-in a computer system. Further, the "computer-readable recording medium" may include a recording medium that dynamically maintains a program for a short time like a communication line in a case where the program is transmitted through a network such as the internet or a communication line such as a telephone line, and a recording medium that maintains the program for a constant time like a volatile memory inside a computer system that is a server or a client at that time. Further, the program may be a program for realizing a part of the above-mentioned function, or a program for realizing the above-mentioned function by a combination with a program that is already recorded in the computer system.

The embodiments of the invention have been described with reference to the accompanying drawings, but specific configurations are not limited to the embodiments, and design of a range without departing from the spirit of the invention may be included therein.

The entire disclosure of Japanese Patent Application No. 2012-046944, filed Mar. 2, 2012 is expressly incorporated by reference herein.

What is claimed is:

1. A polarization controller adapted to output respective projection lights for a right-eye image and a left-eye image that are incident from a projector to a screen in different polarization directions, comprising:
   a liquid crystal device adapted to change the polarization directions of the projection lights; and
   a controller adapted to control the liquid crystal device so that the respective projection lights for the right-eye image and the left-eye image have different polarization directions,
   wherein the controller performs control for mirror-reversing the polarization directions of the projection lights in the liquid crystal device in association with a mirror reversal process of the images in the projector according to a control signal indicating whether the projector performs mirror reversal of the right-eye image and the left-eye image, input from the projector.

2. The polarization controller according to claim 1, wherein the controller performs control so that the polarization directions of the respective projection lights for the right-eye image and the left-eye image become predetermined polarization directions in a case where the number of reflections of the projection lights is even, and so that the polarization directions of the respective projection lights for the right-eye image and the left-eye image become polarization directions obtained by mirror-reversing the predetermined polarization directions in a case where the number of reflections of the projection lights is odd.

3. The polarization controller according to claim 1, wherein the control signal is a signal indicating that the mirror-reversal process of the right-eye image and the left-eye image is performed in the projector according to the number of reflections of the projection lights, and wherein the controller performs control so that the polarization directions of the respective projection lights for the right-eye image and the left-eye image are mirror-reversed in synchronization with the control signal.

4. A projector system comprising:
a projector adapted to output respective projection lights for a right-eye image and a left-eye image; and
a polarization controller including a liquid crystal device adapted to change polarization directions of the projection lights, and a controller adapted to control the liquid crystal device so that the respective projection lights for the right-eye image and the left-eye image have different polarization directions,
wherein the controller performs control for mirror-reversing the polarization directions of the projection lights in the liquid crystal device according to a control signal indicating that the projector performs mirror reversal of the right-eye image and the left-eye image, input from the projector.

5. A projector system comprising:
a first projector adapted to output a projection light for a right-eye image;
a second projector adapted to output a projection light for a left-eye image;
a first polarization controller that is provided corresponding to the first projector and includes a first liquid crystal device adapted to polarize a polarization direction of the projection light for the right-eye image and a first controller adapted to control the first liquid crystal device; and
a second polarization controller that is provided corresponding to the second projector and includes a second liquid crystal device adapted to polarize a polarization direction of the projection light for the left-eye image and a second controller adapted to control the second liquid crystal device so that the polarization direction of the projection light for the left-eye image becomes a polarization direction different from the polarization direction of the right-eye image,
wherein the first controller performs control for mirror-reversing the polarization direction of the projection light in the first liquid crystal device according to a control signal indicating that the first projector performs mirror reversal of the right-eye image, input from the first projector, and the second controller performs control for mirror-reversing the polarization direction of the projection light in the second liquid crystal device according to a control signal indicating that the second projector performs mirror reversal of the left-eye image, input from the second projector.

6. A polarization control method of outputting respective projection lights for a right-eye image and a left-eye image that are incident from a projector to a screen in different polarization directions, the method comprising:
changing the polarization directions of the projection lights, with a liquid crystal device; and
controlling the liquid crystal device so that the respective projection lights for the right-eye image and the left-eye image have different polarization directions, with a controller,
wherein the controller performs control for mirror-reversing the polarization directions of the projection lights in the liquid crystal device in association with a mirror reversal process of the images in the projector according to a control signal indicating whether the projector performs mirror reversal of the right-eye image and the left-eye image, input from the projector.

7. A projector system comprising:
a first projector adapted to output a projection light for any one of a right-eye image and a left-eye image;
a second projector adapted to output a projection light for an image that is not projected by the first projector, among the right-eye image and the left-eye image;
a first polarization controller that is provided corresponding to the first projector and polarizes a polarization direction of the projection light from the first projector into a first polarization direction; and
a second polarization controller that is provided corresponding to the second projector and polarizes a polarization direction of the projection light from the second projector into a second polarization direction different from the first polarization direction,
wherein control is performed so that the image projected from the first projector is changed from one of the right-eye image and the left-eye image into the other thereof and the image projected from the second projector is changed from the other of the right-eye image and the left-eye image into the one thereof according to a control signal indicating whether to perform mirror-reversal.

8. An image control method of performing selection so that each projection light for a right-eye image and a left-eye image is projected from any one of a first projector and a second projector, the method comprising:
performing control so that the image projected from the first projector is changed from one of the right-eye image and the left-eye image into the other thereof and the image projected from the second projector is changed from the other of the right-eye image and the left-eye image into the one thereof, in association with a mirror-reversal process of the images in the first and second projectors, according to a control signal indicating whether to perform mirror-reversal of the images output from the first and second projectors.

* * * * *